United States Patent [19]

Miller

[11] Patent Number: 4,610,415
[45] Date of Patent: Sep. 9, 1986

[54] TILTABLE SUPPORT

[75] Inventor: Robert J. Miller, Salford, Pa.

[73] Assignee: Decision Data Computer Corporation, Horsham, Pa.

[21] Appl. No.: 506,901

[22] Filed: Jun. 22, 1983

[51] Int. Cl.[4] .............................................. A47B 91/02
[52] U.S. Cl. .................................... 248/455; 248/371; 248/171; 248/439; 108/1; 108/9
[58] Field of Search ............... 248/454, 455, 463, 464, 248/371, 398, 163.1, 166, 168, 169, 170, 171, 439, 188.1, 188.2, 188.6; 108/129–131, 133, 1, 9; 16/99

[56] References Cited

U.S. PATENT DOCUMENTS

| | | | |
|---|---|---|---|
| 1,436,441 | 11/1922 | Gaudreau | 248/170 |
| 1,943,563 | 1/1934 | Stoner | 108/130 |
| 2,215,012 | 9/1940 | McGregor . | |
| 2,980,163 | 4/1961 | Pickles . | |
| 3,008,681 | 11/1961 | Matthews . | |
| 3,022,035 | 2/1962 | Pickles . | |
| 3,633,242 | 1/1972 | Wasofsky | 248/439 |
| 3,669,398 | 6/1972 | Robinson . | |
| 3,750,989 | 8/1973 | Bergeson . | |
| 4,064,591 | 12/1977 | Hutchison | 248/188.1 |

FOREIGN PATENT DOCUMENTS

| | | | |
|---|---|---|---|
| 7710976 | 4/1978 | Netherlands | 248/188.2 |
| 960768 | 6/1964 | United Kingdom | 108/130 |

Primary Examiner—J. Franklin Foss
Assistant Examiner—Robert A. Olson
Attorney, Agent, or Firm—Charles H. Lindrooth

[57] ABSTRACT

A tilt mechanism, particularly well suited for a control console such as a low profile keyboard is disclosed. Elongated spring biased links extend lengthwise of the console in side-by-side relationship. A pair of support feet, pivotally mounted on the underside of the keyboard are movable from retracted positions by the spring biased links to positions at which the keyboard is progressively more tilted. Control means consisting of a button or key selectively control the movements of the links under the action of the biasing means.

6 Claims, 7 Drawing Figures

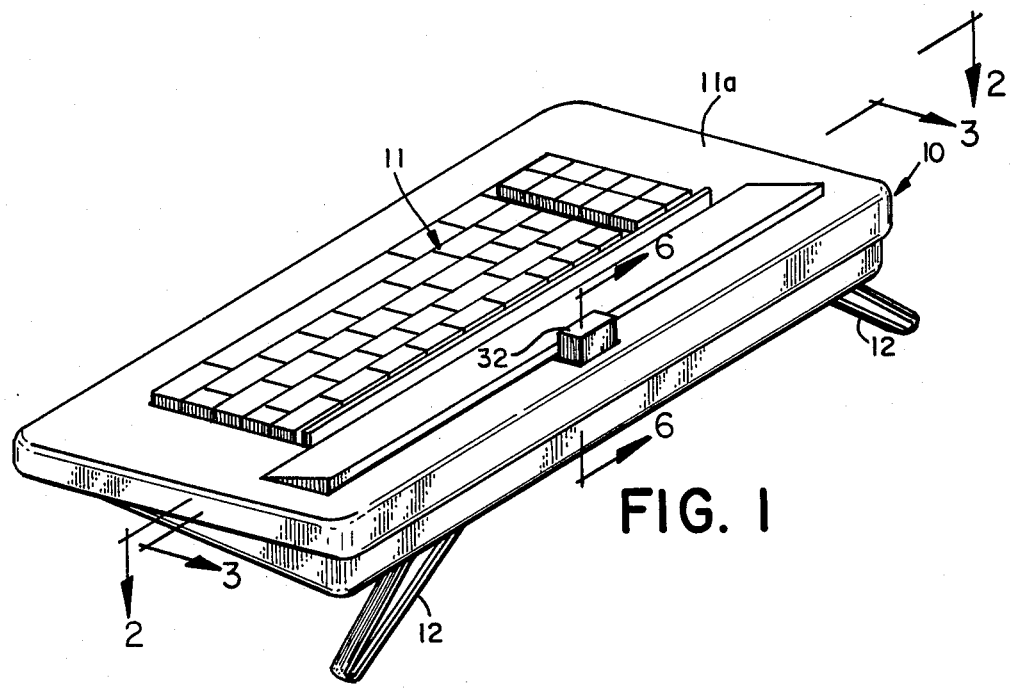
FIG. 1
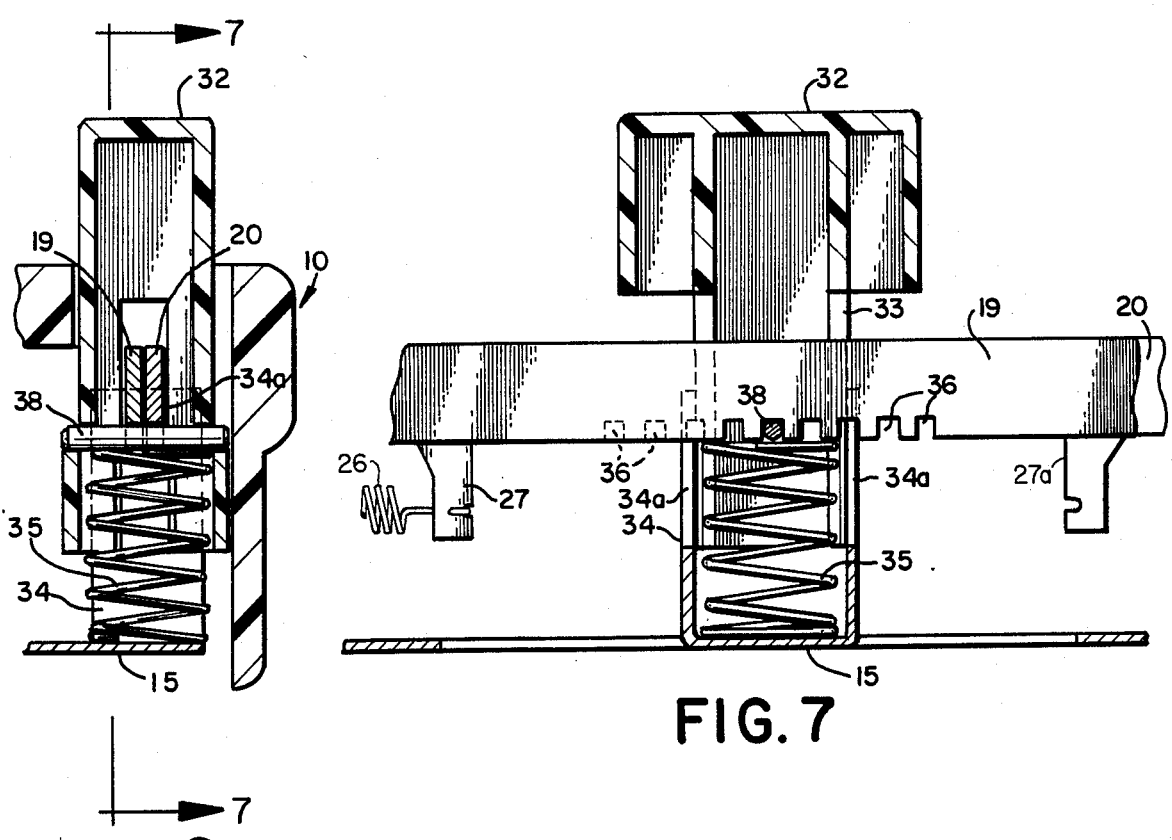
FIG. 6
FIG. 7

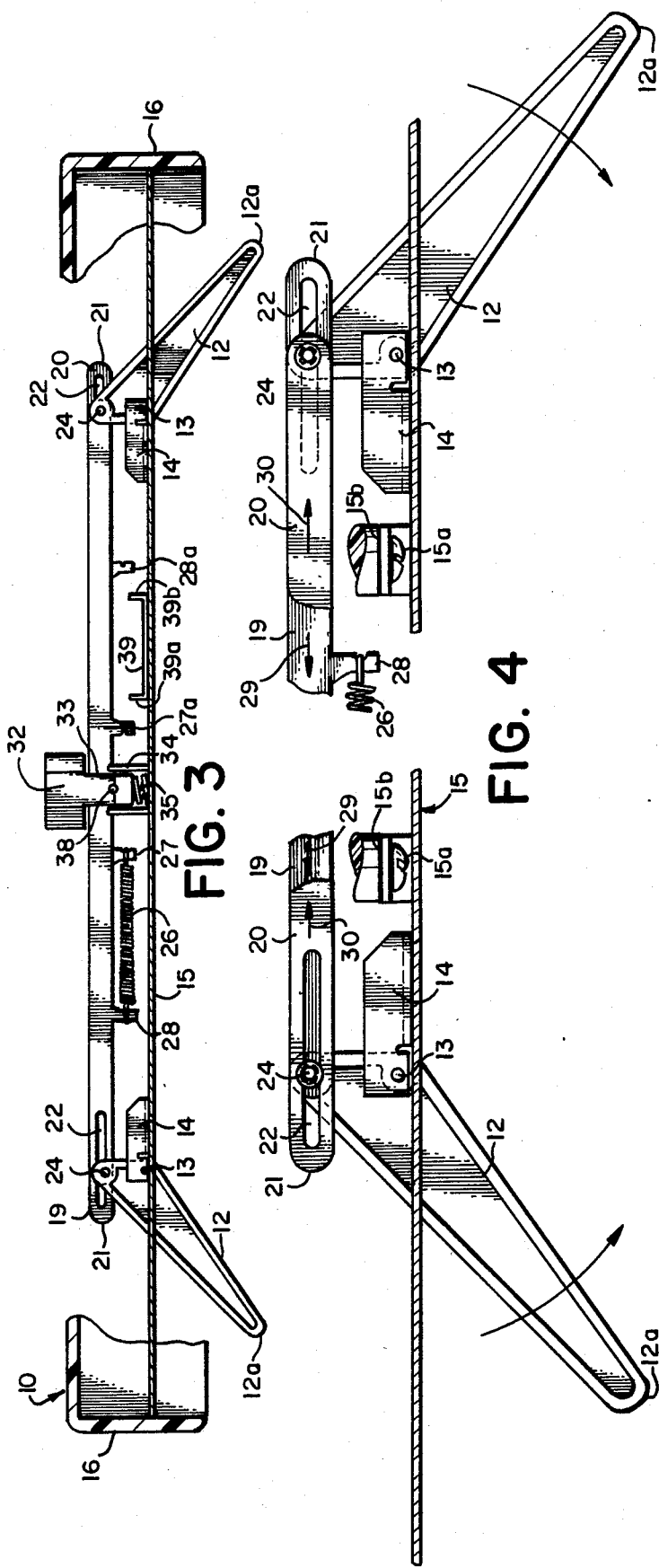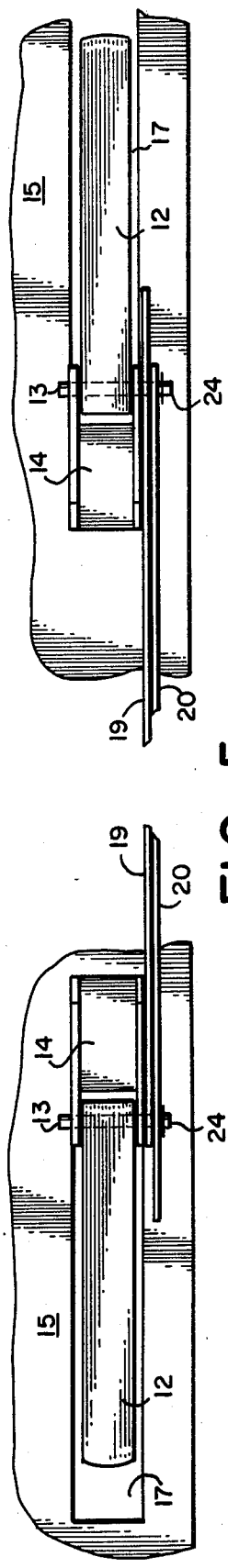
FIG. 3
FIG. 4
FIG. 5

TILTABLE SUPPORT

FIELD OF THE INVENTION

This invention relates to a tiltable support used for the support of a keyboard or control panel-type console wherein the support has the capability of supporting the console at selected angles of tilt on a desk, a table or the like.

BACKGROUND OF THE INVENTION

In a keyboard-type console, it is desirable and sometimes mandated by industry standards that the console be tiltable from a position in which it lies flat on a table top to different tilt angles to suit the convenience and comfort of the operator when the operator is using the keyboard to input data. As the use of CRT work stations, personal computers and the like becomes more universal in all types of office applications, there is a growing demand for a compact relatively thin keyboard console which is capable of maintaining a relatively low profile on a table top or desk and yet is quickly and easily adjustable to the appropriate tilt angle desired by the operator.

One known tilt mechanism involves the use of one or more cams which are operated by a rotatable wheel on the side of the console. The cam interacts with a follower to tilt the keyboard to the proper angle. Other known arrangements involve the use of ratcheting spring biased feet or gear and pinion-type devices as are frequently used in the slide projectors. These mechanisms are usually not very compact, not having as low a profile as is desirable and frequently are not convenient to operate.

SUMMARY AND OBJECTS OF THE INVENTION

The principal object of the invention is the provision of a simple and effective keyboard tilt mechanism which fits within a console which is relatively thin in vertical dimension so that the console does not project appreciably above the work surface upon which it is mounted.

A further object of the invention is the provision of a tilt mechanism operable by means of a button on the keyboard for movement of the console to a plurality of discrete angular positions by the touch of a finger.

A still further object of the invention is the provision of a tilt mechanism which permits easy tilting of the keyboard throughout a wider range of angular positions as compared with known prior art devices.

In summary, the invention involves the provision of a pair of pivotally mounted feet each mounted for pivotal movement in a plane which is adjacent to the side of the console spaced away from the operator side. Control mechanism is provided for movement of the feet between a retracted position in which the console is at a minimum tilt position and an extended position in which the console is at a maximum tilt position. The control mechanism preferably comprises a pair of elongated links mounted in parallel relationship in planes substantially parallel to the plane of pivotal movement of each foot. Pivotal connecting means connect an end of one link with a foot at a point on said foot offset from the axis of the pivotal mounting means. Means are provided for biasing the links for movement along the long axis thereof. Manually actuatable control means provide finger tip control to controllably release the links for movement to a plurality of discrete positions under the action of said biasing means to effect pivotal movement of the feet and adjustment of the keyboard to the selected angular position.

BRIEF DESCRIPTION OF THE DRAWINGS

How the foregoing and various objects and advantages of the invention not specifically mentioned above are achieved will become apparent from the following detailed description of a preferred embodiment of the invention and taken in conjunction with the appended drawings in which:

FIG. 1 is a tiltable keyboard incorporating a preferred embodiment of tilt mechanism of the invention;

FIG. 3 is a vertical sectional view taken on line 3—3 of FIG. 1;

FIG. 4 is a vertical sectional view taken on line 4—4 of FIG. 2 on an enlarged scale with respect to FIG. 2 with intermediate portions of the mechanism omitted;

FIG. 5 is a plan view of the mechanism shown in FIG. 4;

FIG. 6 is a fragmentary sectional view taken on line 6—6 of FIG. 1 illustrating portions of the mechanism omitted from FIGS. 4 and 5; and FIG. 7 is a sectional view taken on line 7—7 of FIG. 6.

DESCRIPTION OF THE PREFERRED EMBODIMENT

Figure 2:
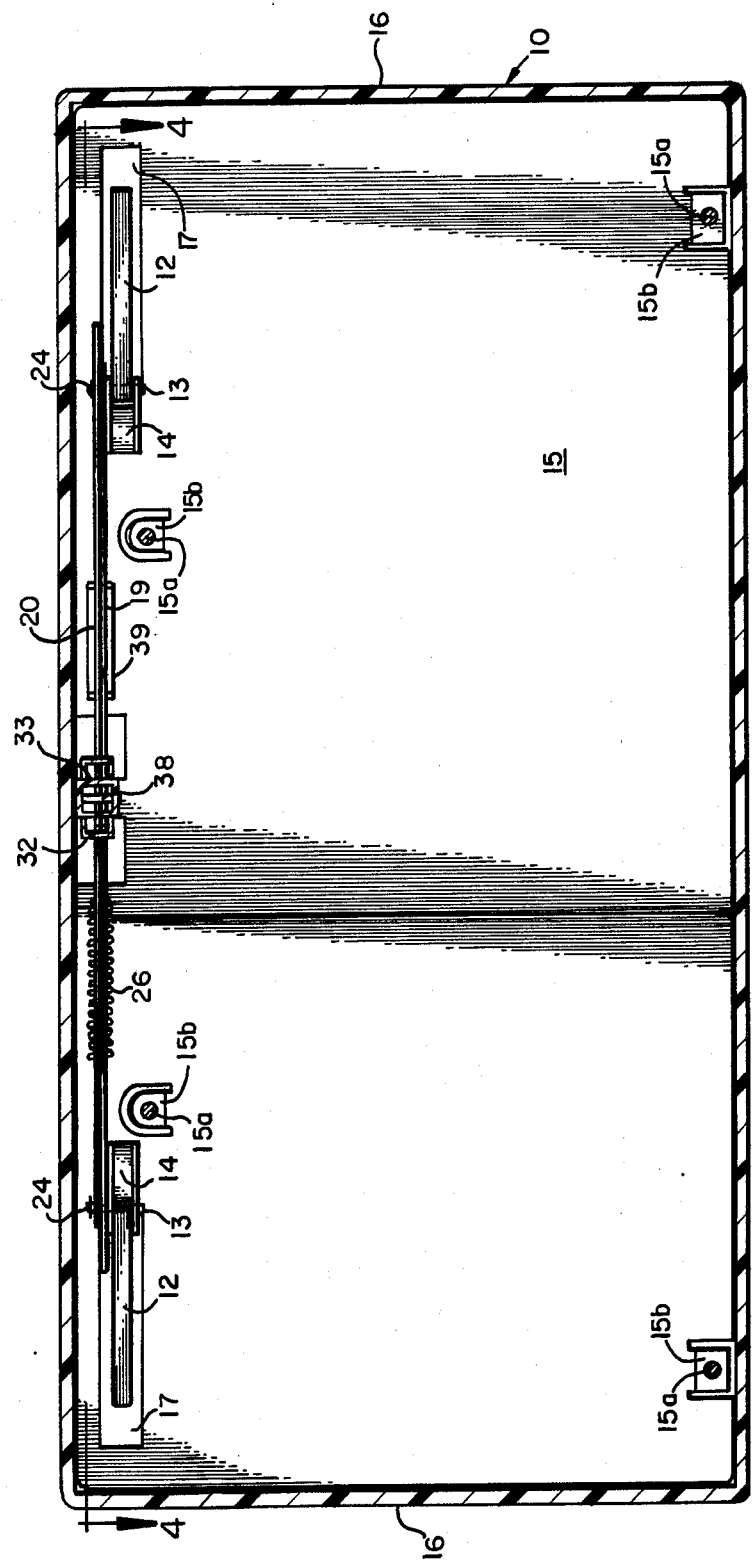
FIG. 2 is a plan sectional view, taken on line 2—2 of FIG. 1.

With reference in particular to FIGS. 1 through 3, the invention is embodied in an elongated, substantially rectangular keyboard console 10 having keys generally illustrated at 11 which generally include standard alpha numeric keys as well as symbol keys necessary for the input and display of data on a standard cathode ray tube terminal, not shown. The console is preferably of a light weight construction and intended to be able to be moved about on the work surface. The console should desirably have a low profile so as to meet specifications applicable in certain parts of the world.

Keyboard 10 is provided with support means including a pair of feet 12 which are pivotally mounted by means of pins or projections 13 on upstanding support 14 extending upwardly from the console base 15 at locations along the back of the console at points substantially equidistantly spaced from the sides 16. Typically the console comprises a molded plastic casing 11a which is mounted on base 15 by means of screws 15a which are screwed into bosses 15b molded into the underside of the casing.

As can be best seen in FIGS. 2, 3 and 5, the feet 12 extend downwardly through elongated rectangular openings 17 cut out of the base plate 15. The feet are illustrated in an intermediate position in FIGS. 1, 3 and 4 and are pivoted to rotate in opposite directions by means to be described hereinafter from a retracted position in which the support surfaces 12a of the feet are swung upwardly so that they are substantially within the openings 17 in plate 15 to extended positions spaced vertically downwardly from the underside of plate 15 in which position the keyboard will be disposed at a position of maximum tilt.

The mechanism for effecting tilt is perhaps best shown in overall view in FIGS. 2 through 4. In the preferred form of the invention a pair of elongated lifting links 19 and 20 are positioned adjacent the rear edge of the console in side-by-side relationship. Links 19 and 20 are preferably of identical construction, each link having an end 21 in which an elongated slot 22 is formed, each slot 22 being extended lenghwise of its link. The links are positioned with the slotted end of one link disposed adjacent to the unslotted end of the other link. Pivotal connecting means comprising pins 24 are located on the feet at points offset from pins 13. Pins 24 project from each foot 12 through the adjacent slot 22 to a point of connection with the unslotted end of the adjacent link. In the intermediate position of adjustment of the feet 12 illustrated in FIGS. 3 and 4, the pivotal connecting means 24 are positioned substantially at the mid points of the slots 22. As viewed in FIG. 4 the slotted end of link 19 extends outwardly beyond the unslotted end of link 20. Similarly the slotted end of link 20 extends outwardly beyond the unslotted end of link 19 as viewed in FIG. 4.

According to the invention, biasing means are provided to exert a biasing force which causes lengthwise movement of the links which is transmitted into pivotal movement of the feet about pivot points 13 through the pivotal connecting pin means 24. Preferably the biasing means comprises a tension spring 26 which interconnects the two links drawing them in opposite directions by means of a depending spring support 27 on link 20 and a depending spring support 28 on link 19. As the links are drawn in opposite directions under action of spring 26, the feet 12 are pivoted downwardly to effect a raising of the console in the embodiment disclosed.

Lengthwise movement of the links in the directions indicated by arrows 29 and 30 in FIG. 4 is preferably under control of a depressible button or key 32 shown in FIGS. 1, 3, 6 and 7. Button 32 is preferably mounted at the rear of the console 10 at a position intermediate the ends or sides 16. Button 32 preferably has an elongated stem 33 which is mounted between the pair of upward guides 34 which are secured to or formed integrally with base 15. Biasing means, preferably in the form of a coil spring 35 rests on base 15 between the guides 34 and acts on a shouldered portion of stem 33 to urge button 32 upwardly.

Each of the links 19 and 20 is provided with a plurality of spaced apart indentations 36 located at intermediate points along its lower edge. The shank of button 32 is conveniently provided with a projection 38 which is urged by means of spring 35 upwardly into engagement with an aligned pair of notches 36 on the links when the notches move into registry.

In use, to adjust the angle of tilt of the keyboard, the operator momentarily depresses button 32 so that projection 38 moves out of aligned slots 36 in the two links. The links are immediately moved by spring 26 in opposite directions as indicated by the arrows 29 and 30 and this lengthwise movement of the links is translated into pivotal movement of the feet from the position in which the feet are retracted and the keyboard is in the minimum tilt position to positions in which the keyboard becomes progressively more tilted. Following release of the button 32, as soon as the next adjoining slots on the two links are in alignment, the projection enters these slots and terminates movement of the links. In order to return the keyboard to a less tilted position, the button 32 is depressed and by pressure exerted on the raised part of the keyboard the legs are forced progressively outwardly until the desired position is reached. Release of the button thereafter locks the legs in the desired position.

In the arrangement shown in FIG. 7, six notches on each link provide for six tilt positions. The degree of tilt and the number of tilt positions may vary depending upon the spacing and the number of notches 36. In order to limit movement of the links, a stop bracket 39 having a pair of stop arms 39a and 39b extend upwardly into the path of ears 27a and 28b which extend downwardly from the links 19 and 20.

Preferably the guides 34 extend upwardly above the lower surface of each of the links 19 and 20 and are slotted as shown at 34a in FIGS. 6 and 7 to provide clearance for the links.

I claim:

1. In a keyboard console or the like, a support mechanism comprising a pair of spaced apart support feet disposed along one side of the console, means pivotally mounting each of said feet on said console for movement to selected angular positions in a plane which is substantially parallel to said one side, each of said feet being movable between an extended position in which the console is at maximum tilt and a retracted position in which said console is at minimum tilt, and control mechanism for controllably adjusting the positions of each of said feet to a plurality of said angular positions including said extended and retracted positions and at least one intermediate position, comprising a pair of links extending in parallel relationship along said one side of said console, a pivotal connecting means connecting one end of one link with one foot and the opposite end of the other link with the other foot at points on said feet offset from the pivotal mounting means whereby said feet are moved from the retracted to the extended position upon lengthwise movement of the links, means biasing the links for movement along the long axes thereof in directions causing pivotal movement of said feet from the retracted towards said extended positions and control means for controllably releasing said links for movement of said feet towards said extended positions under the action of said biasing means, said control means including stop means engagable with each said link at spaced positions lengthwise of the links and actuating means selectively operable for selectively disengaging and engaging said stop means at said spaced positions.

2. A support mechanism according to claim 1 wherein the link biasing means biases the links for movement in opposite directions.

3. A support mechanism according to claim 2 wherein the links are interconnected by said biasing means for exerting a lengthwise movement of each of said links in opposite directions.

4. A support mechanism according to claim 1 wherein said control means includes a lengthwise slot adjacent one end of each said link, the pivotal connecting means including a pin on each foot of said pair of feet, each said pin extending through the slot of one of said links and being pivotally connected to the other of said links.

5. A support mechanism according to claim 4 wherein said actuating means further comprises a manually operable control key on said console and said stop means includes a plurality of spaced apart notches on each link, a projection on said key movable into a position of engagement with the notches to prevent movement of the links, biasing means associated with said key for urging the projection into the notches, said key being manually actuable to remove the projection from the notches whereby the links are freed for relative movement under action of said link biasing means.

6. In a keyboard console or the like, a support mechanism comprising a pair of support feet, means pivotally mounting said feet on the underside of said keyboard console in spaced apart relationship along one side thereof, said feet being movable about said pivotal mounting means in unison in vertically oriented places between extended positions in which the console is at a position of maximum tilt and retracted positions in which the console is in the minimum tilt position, and control mechanism for adjusting the angle of tilt of the console, said control mechanism comprising a pair of links extending lengthwise of the console in adjacent parallel relationship, biasing means interconnecting said links for urging the links in opposite directions lengthwise thereof, each of said feet having a pin-like connecting means for connecting a foot of said pair of feet with the adjacent end of one of said links, the connecting means being located on said feet at points offset from the pivotal mounting means in directions in which movement of the links by the biasing means produces movement of said feet from the retracted to the extended positions, and control means for controllably releasing said links for movement by said feet about said pivotal mounting means, said links each have an elongated slot in one end, the slotted end of one link being adjacent the unslotted end of the other link, the pin-like connecting means for the foot of each link extending through the slotted end of one link and being connected to the unslotted end of the other link.

* * * * *